United States Patent [19]

Eda

[11] Patent Number: 5,608,577
[45] Date of Patent: Mar. 4, 1997

[54] OPTICAL MIRROR AND OPTICAL DEVICE USING THE SAME

[75] Inventor: Akira Eda, Sodegaura, Japan

[73] Assignee: Mitsui Petrochemical Industries, Ltd., Tokyo, Japan

[21] Appl. No.: 633,520

[22] Filed: Apr. 17, 1996

Related U.S. Application Data

[63] Continuation of Ser. No. 205,723, Mar. 4, 1994, which is a continuation-in-part of Ser. No. 39,142, filed as PCT/JP92/01106 Aug. 28, 1992, abandoned.

[30] Foreign Application Priority Data

Aug. 30, 1991 [JP] Japan ..................... 3-220587

[51] Int. Cl.$^6$ ........................................ G02B 5/28
[52] U.S. Cl. ................... 359/584; 359/580; 359/588; 359/589
[58] Field of Search ................... 359/580, 588, 359/589, 584; 372/22, 45, 99; 455/54.1, 56.1, 67.3

[56] References Cited

U.S. PATENT DOCUMENTS

| | | | |
|---|---|---|---|
| 4,337,790 | 7/1982 | Fan et al. | 359/589 |
| 4,337,990 | 7/1982 | Fan et al. | 359/360 |
| 5,257,140 | 10/1993 | Rogers | 359/884 |
| 5,283,692 | 2/1994 | Herbst | 359/589 |

FOREIGN PATENT DOCUMENTS

| | | |
|---|---|---|
| 56-13782 | 2/1981 | Japan . |
| 58-185445 | 10/1983 | Japan . |
| 59-147586 | 8/1984 | Japan . |
| 60-264334 | 12/1985 | Japan . |
| 61-112101 | 5/1986 | Japan . |
| 62-161532 | 7/1987 | Japan . |
| 62-148904 | 7/1987 | Japan . |
| 62-208002 | 9/1987 | Japan . |
| 63-314516 | 12/1988 | Japan . |
| 3168606 | 7/1991 | Japan . |
| 3190166 | 8/1991 | Japan . |
| 3218067 | 9/1991 | Japan . |
| 3219215 | 9/1991 | Japan . |
| 3292784 | 12/1991 | Japan . |
| 5173003 | 7/1993 | Japan . |
| 5102603 | 8/1993 | Japan . |
| 5341345 | 12/1993 | Japan . |
| 8602775 | 5/1986 | WIPO . |

OTHER PUBLICATIONS

"Ion–Beam Etching of InP and Its Application to the Fabrication of High . . . " Electrochemical Oxidation of HCOOH, vol. 131, No. 10. Oct. 1984.
"High Radiance InGaAsP/InP Lensed LED's for Optical Communication Systems . . . " IEE Journal of Quantum Electronics, vol. QE–17, No. 2, Feb. 1981.

Primary Examiner—David C. Nelms
Assistant Examiner—Vu A. Le
Attorney, Agent, or Firm—Sherman and Shalloway

[57] ABSTRACT

The present invention provides an optical mirror and an optical device in which the mirror is capable of reflecting a light beam having a plurality of wavelengths with the phase matching condition required for nonlinear optical materials being satisfied, so that a decrease in efficiency due to the phase difference does not generate even if harmonic generation, optical mixing or the like is performed, thereby improving conversion efficiency. The optical mirror includes a plurality of reflection films, e.g., multilayer films 2 and 3, formed on one surface of a transparent substrate, each of which films corresponds to each wavelength of a light beam having a plurality of wavelengths to reflect selectively one of said plurality of wavelengths, wherein a phase difference adjusting layer 4 is formed between the two reflection films 2 and 3, reflecting light beams having different wavelengths. The adjusting layer eliminates the phase difference between a phase of the light beam reflected by the 2 or 3 of the reflection films and a phase of the light beam reflected by the other 3 or 2 of the reflection films. This optical mirror can be suitably applied to second harmonic generation, optical mixing, optical parametric generation and the like because it is capable of reflecting with the phase matching condition required for the nonlinear optical materials being satisfied and has high conversion efficiency.

23 Claims, 5 Drawing Sheets

OPTICAL MIRROR AND OPTICAL DEVICE USING THE SAME

This application is a continuation of application Ser. No. 08/205,723, filed Mar. 4, 1994, which is a continuation-in-part of application Ser. No. 08/039,142 filed Apr. 27, 1993, which is based on International Application PCT/JP92/01106, filed Aug. 28, 1992 to which priority is claimed.

TECHNICAL FIELD

This invention relates to an optical mirror and an optical device using the same, where the mirror is incorporated with a plurality of dielectric reflection multilayer film coatings each of which has high reflectance to plural wavelengths or with a combination of dielectric reflection multilayer film coatings and metal reflection film coatings, and more particularly, to an optical mirror suitable for second harmonic generation, optical mixing, optical parametric generation and the like applying nonlinear optical effects.

BACKGROUND ART

A nonlinear optical device for converting an optical frequency by applying nonlinear interaction, e.g., second harmonic generation, of an optical wave in a nonlinear optical material, in many cases, uses two concave reflection mirrors for laser-resonating. One of these reflection mirrors is a total reflection mirror (or a high reflection mirror) while the other is a reflection mirror through which a portion of laser beam transmits.

The high reflection mirror among them comprises, as shown in, for example, FIG. 4, plural reflection multilayer films 2 and 3 consisting of a plurality of reflection films 2a, 2b, 3a, and 3b laminated on one surface of a transparent substrate 1, each of which multilayer films 2 and 3 corresponds to each wavelength of plural wavelengths of a light beam to selectively-reflect one of said plurality of wavelengths, respectively. Each of the reflection multilayer films 2 and 3 is formed by alternately laminating usually different dielectric materials (e.g., $SiO_2$ and $TiO_2$), as shown herein as the reflection films 2a and 2b or 3a and 3b, at such a film thickness as being capable of providing a maximum reflectance at each specific wavelength.

However, in the conventional optical mirror for use in a plurality of wavelengths, as shown in FIG. 4, there is considered only a reflection amplitude, so that a phase matching condition required for nonlinear optical materials is not satisfied. As a result, when the second harmonic generation, the optical mixing or the like is performed using the nonlinear optical material, there occurs a disadvantage of decreasing efficiency due to a phase shift between an exciting light beam and a newly generated light beam when these light beams are reflected by a mirror.

SUMMARY OF THE INVENTION

An object of the present invention is to provide an optical mirror and an optical device using the same in which the mirror is capable of reflecting a light beam having a plurality of wavelengths with the phase matching condition required for nonlinear optical materials being satisfied, so that no decrease of efficiency due to the phase shift generates even if the harmonic generation, the optical mixing or the like is performed, thereby being capable of improving conversion efficiency.

In order to achieve the above mentioned object, the present invention applies the following means.

The present invention is characterized by an optical mirror comprising a plurality of reflection films formed on at least one surface of a transparent substrate each of which films corresponds to each wavelength of a light beam having a plurality of wavelengths to reflect selectively one of said plurality of wavelengths, wherein:

a phase difference adjusting layer is formed between these two reflection films reflecting the light beam having different wavelengths, said adjusting layer adjusting interrelation, especially a phase difference, between a phase of the light beam reflected by one of the reflection films and a phase of the light beam reflected by the other of the reflection films.

The present invention may apply the following embodiments.

(1) The plural wavelengths constituting the light beam are in a relation of a multiple of an integral number or in relation of a reciprocal of an integral number with each other.
(2) Said phase difference adjusting layer is made of the same material as any one of said reflection films.
(3) Said phase difference adjusting layer consists of an air gap.
(4) Said phase difference adjusting layer is formed between adjacent two reflection multilayer films.
(5) Said reflection films each are laminated as two layers. Of course, more layers may be applied.
(6) Said reflection films consist of multilayer films.
(7) One of said reflection films is a reflection film such as a metal film (e.g., aluminum) which is non-selective to wavelengths.
(8) Said reflection films consist of multilayer films, and said phase difference adjusting layer is not formed between a first reflection multilayer film for reflecting a light beam having a certain wavelength and a second reflection multilayer film for reflecting a light beam having a wavelength different from the above wavelength but is formed between the multilayer films of the first reflection multilayer film or between the multilayer films of the second reflection multilayer film.
(9) The transparent substrate is made of glass, a nonlinear optical crystal (for example; $KNbO_3$, $KTiOPO_4$, $LiNbO_3$, $\beta$-$BaB_2O_4$, $LIB_3O_5$, $Ba_2NaNb_5O_{15}$, $LiIO_3$, KDP and ADP), a metal or the like. The surface, on which said two reflection films and phase difference adjusting layers are formed, of the transparent substrate may be plane or may have at least one convex portion for providing a lens effect. All possible combinations of (1) to (9) may be also applied.

An optical mirror according to the present invention can be applied to various optical devices such as a second harmonic generating device, a multi-wavelengths mixing device, a sum frequency generating device, a difference frequency generating device or a parametric oscillating device.

Principles of the present invention will be described with reference to FIGS. 1 and 6.

As shown in FIG. 1, when the second harmonic generation of a light beam is performed using, for example, $KNbO_3$, reflection films 102, for example, 860 nmHR are at first formed on both end surfaces of $KNbO_3$ 101, respectively, to trap a fundamental wave of 860 nm between the reflection films for 860 nmHR. This results in generation of a second harmonic (SHG) of 430 nm from the end surfaces. The output thereof is indicated by a line S (□—□—□) in FIG. 6.

Subsequently, a reflection film 103 for 430 nmHR is laminated on one of the reflection films for 860 nmHR. As a result, the second harmonic of 430 nm is reflected by the reflection film for 430 nmHR and emerges from the other end surface. The output of this case is indicated by a line W (○—○—○) in FIG. 6. It is because the phase is reversed that the output becomes zero at a wavelength of 1.3. In this event, no gap is especially formed between the left-hand reflection film 102 for 860 nmHR and the reflection film 103 for 430 nmHR in FIG. 1.

To match the phase difference between the light beam of 430 nm and that of 860 nm, a phase difference adjusting layer 104 is formed between the reflection film 102 for 860 nmHR and the reflection film 103 for 430 nmHR. The resulting output is as indicated by a line C (Δ—Δ—Δ) in FIG. 6.

The film thickness of the phase difference adjusting layer, i.e., a distance between the reflection film for 860 nmHR and the reflecting film for 430 nmHR, which is equal to $4\lambda/5$ ($\lambda$=430 nm) in this example, is determined depending on the phase difference for each case.

A preferred embodiment of the present invention will be described below with reference to the drawing.

An optical mirror according to the present invention will be described with reference to the drawing in which, FIG. 2 shows an optical mirror according to an embodiment of the present invention when applied to a light beam having two different wavelengths. The optical mirror comprises a first reflection multilayer film 2 for reflecting selectively one wavelength of the two wavelengths of said light beam, formed on one surface of a transparent substrate 1 such as a concave mirror, a second reflection multilayer film 3 adjacent to the reflection multilayer film 2 for reflecting selectively the other wavelength, and a layer 4 positioned therebetween for adjusting phase difference between the light beams reflected by said two reflection multilayer films 2 and 3.

The first reflection multilayer film 2 comprises a laminate of two reflection films 2a and 2b each reflecting selectively one wavelength, said laminate being prepared by alternately laminating each reflection film. The second reflection multilayer film 3 comprises a laminate of two reflection films 3a and 3b each reflecting selectively the other wavelength, said laminate being prepared by alternately laminating each reflection film. The method itself for forming the first reflection multilayer film 2 or the second reflection multilayer film 3 may be the same as the conventional method, which can be formed typically by selecting two of the dielectric materials such as $SiO_2$ and $TiO_2$, depending on the selected wavelength to laminate alternately the dielectric materials at such a film thickness providing a maximum reflectance at each specific wavelength as being capable of (generally a film thickness corresponding to ½ or ¼λ (wavelength), and preferably ¼λ) using techniques such as deposition or sputtering.

The thickness of the reflection multilayer film 2 or 3 is generally about 2–4 µm, though it significantly varies depending on the thickness or the number of layers of the reflection films 2a, 2b or 3a, 3b.

In addition, in the present invention, the layer 4 is formed between adjacent two reflection multilayer films 2 and 3, which layer adjusts the phase difference between the light beams reflected by the reflection multilayer films. The layer 4 is a layer for reflecting the light beams having a plurality of wavelengths at a specific phase difference by means of adjusting the interrelation, especially the phase difference, between the light beams reflected by said two reflection multilayer films in order to prevent a decrease in efficiency due to the phase relation between the light beams of wavelengths reflected, and is made of the same dielectric material such as $SiO_2$ or $TiO_2$ as the material of the reflection film and preferably the same material as the reflection material of one of the two reflection films.

The phase difference adjusting layer 4 may preferably be formed between the two reflection multilayer films 2 and 3, though it may be formed between any adjacent two reflection films 2a and 2b or 3a and 3b composed of the reflection multilayer film 2 or 3 of the adjacent two reflection multilayer films 2 and 3.

As a method for preparing the phase difference adjusting layer 4, a method such as deposition or sputtering is generally applied. The thickness of the phase difference adjusting layer 4 is generally about 0.2–1 µm in case of corresponding to ½ wavelength or about 0.05–0.5 µm in case of corresponding to ¼ wavelength, though it may be varied depending on the phase difference.

Light beams applied to the optical mirror according to the present invention may be those having a plurality of wavelengths.

While the optical mirror according to the present invention has thus been described in conjunction with the example of application to the light beam having two wavelengths, it is apparent that the present invention can be applied to a light beam having three or more wavelengths by means of providing all of the reflection multilayer films which has high reflectance corresponding to each wavelength as well as providing all of the above mentioned phase difference adjusting layer formed between the adjacent two reflection multilayer films or between any adjacent two reflection films of either one of the reflection multilayer films among these reflection multilayer films. Further, it is apparent that the reflection films constituting each of the multilayer reflection films may be three or more kinds, though the reflection films are two kinds in said example.

Next, an embodiment of the optical mirror according to the present invention applied to an optical device capable of using for second harmonic generation is shown in FIG. 3.

In FIG. 3, 11 represents a laser diode, 12 represents a Faraday isolator, 17 represents a collimator lens, 13 represents a condenser lens, 14 represents a two-wavelengths high reflection concave mirror (an optical mirror), 15 represents a single wavelength high reflection concave mirror and 16 represents a nonlinear optical single crystal. The optical mirror according to the present invention is set and used at the position 14.

Action of the optical mirror is described in conjunction with an example shown in FIG. 2. In one embodiment, one wavelength of a light beam having two wavelengths introduced from the side of the transparent substrate 1 is reflected by the reflection multilayer film 2, during passing therethrough, which is composed of laminated two different reflection films 2a and 2b. The other wavelength transmits through the reflection multilayer film 2 and the phase difference adjusting layer 4 without being substantially reflected, which is then reflected by the reflection multilayer film 3, during passing therethrough, which is comprised of laminated two different reflection films 3a and 3b. In another embodiment, one wavelength of a light beam having two wavelengths introduced from the opposite side of the transparent substrate 1 is reflected by the reflection multilayer film 3 comprised of said reflection films 3a and 3b during passing therethrough. The other wavelength transmits through the reflection multilayer film 3 and the phase difference adjusting film 4 without being substantially reflected, which is then reflected by the reflection multilayer film 2 composed of said reflection films 2a and 2b during passing therethrough. In either case, the phase difference between the light beams reflected by both reflection multilayer films 2 and 3 is adjusted by the phase difference adjusting layer 4 formed between these multilayer films. Accordingly, said light beam having a plurality of wavelengths is reflected due to the specific phase difference. This results in prevention of an efficiency loss due to the phase relation.

In addition, when such an optical mirror is set at 14 of an optical device as shown in FIG. 3 to perform the second harmonic generation, the optical mirror reflects the light beam having a plurality of wavelengths while satisfying the phase matching condition required for the nonlinear optical effect, thereby improving conversion efficiency.

Practical examples are described where the above mentioned optical mirror is applied. The below Examples 1 and 3 represent preferred embodiments of the invention.

<EXAMPLE 1>

Figure 1:
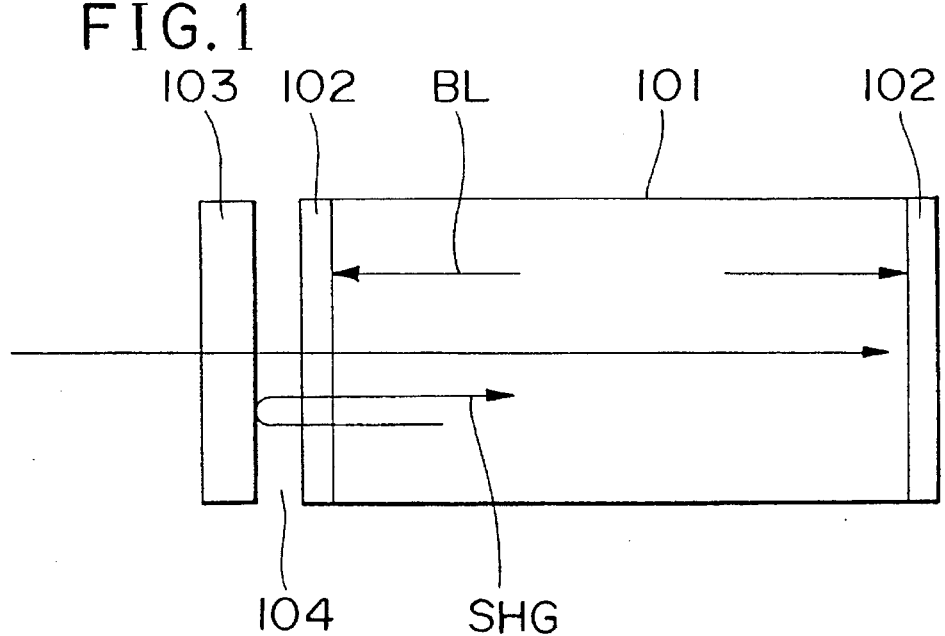
FIG. 1 is a view showing the action principle of an optical mirror according to the present invention.
Figure 2:
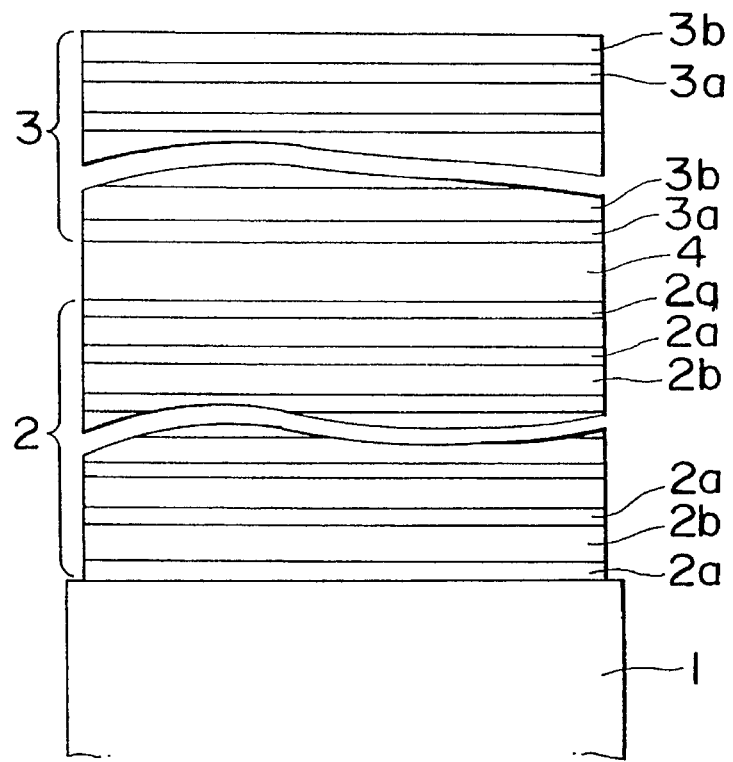
FIG. 2 is a partially cutaway sectional view showing an optical mirror according to an embodiment of the present invention.

As shown in FIG. 2, a first reflection multilayer film 2 that exhibits a high reflectance at 430 nm was formed on a transparent substrate 1, which is made of a standard glass of BK7 glass produced by Sigma Optical Device Inc., by alternately laminating a reflection film 2a (about 0.07 μm in thickness corresponding to an optical thickness of λ/4) consisting of SiO$_2$ thin films and a reflection film 2b (about 0.05 μm in thickness corresponding to an optical thickness of λ/4) consisting of TiO$_2$ thin films according to deposition at such a film thickness as being capable of providing a maximum reflectance at a wavelength of 430 nm to produce twenty-nine layers (fourteen cycles plus one layer). SiO$_2$ was then laminated thereon to form a phase difference adjusting layer 4 of 0.24 μm in thickness according to deposition, which thickness corresponds substantially to an optical thickness of 4λ/4 when measured at an wavelength of 430 nm. A second reflection multilayer film 3 that exhibits a high reflectance at 860 nm was formed thereon by alternately laminating reflection films 3a (about 0.11 μm in thickness.) consisting of TiO$_2$ thin films and reflection films 3b (about 0.15 μm in thickness) consisting of SiO$_2$ thin films according to deposition at such a film thickness as being capable of providing a maximum reflectance at a wavelength of 860 nm to produce twelve layers (six cycles). Thus, a two-wavelengths high reflection optical mirror (hereinafter referred to as C-coat mirror) was made with the forty-two layers in total.

<Comparative Example 1>

Figure 4:
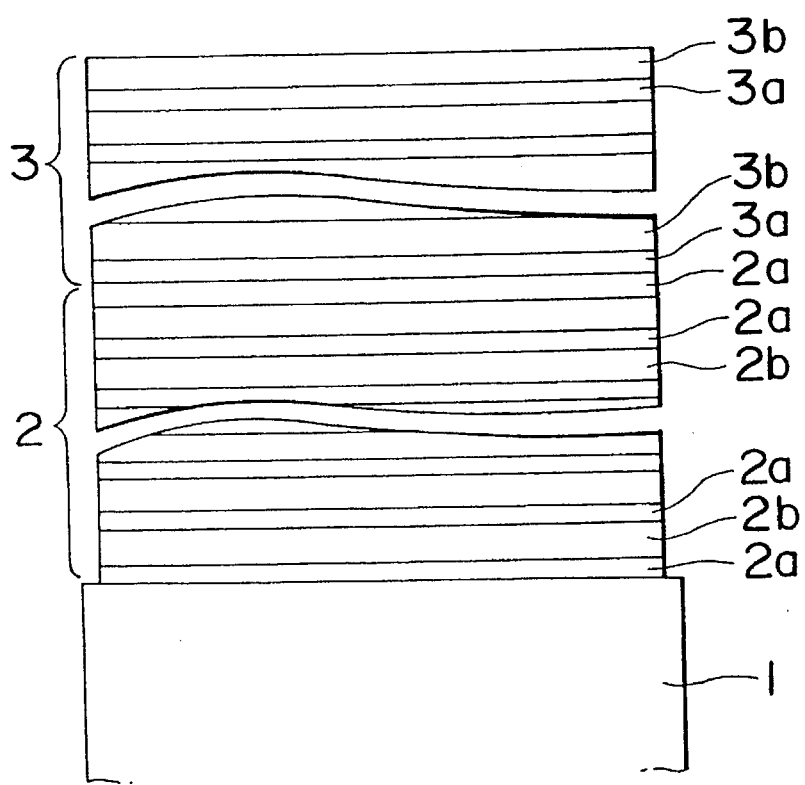
FIG. 4 is a partially cutaway sectional view showing the conventional optical mirrors made in Comparative Examples 1 and 3.

An optical mirror (hereinafter referred to as W-coat mirror) for comparison as shown in FIG. 4 was made in the same manner as in Example 1 except that the phase difference adjusting layer was not formed.

<Comparative Example 2>

Figure 5:
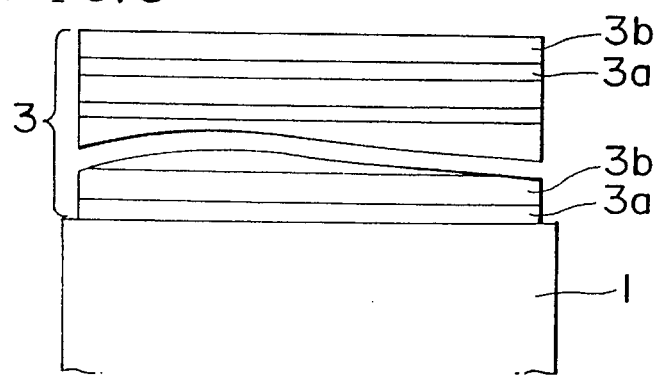
FIG. 5 is a partially cutaway sectional view showing the referential optical mirrors made in Comparative Examples 2 and 4.

An optical mirror (hereinafter referred to as S coat mirror) for comparison as shown in FIG. 5 was made by alternately laminating, on the transparent substrate 1 used in Example 1, reflection films 3a (about 0.11 μm in thickness) consisting of TiO$_2$ thin films and reflection films 3b (about 0.15 μm in thickness) consisting of SiO$_2$ thin films by means of deposition at such a film thickness as being capable of providing a maximum reflectance at a wavelength of 860 nm to produce twelve layers(six cycles).

Figure 3:
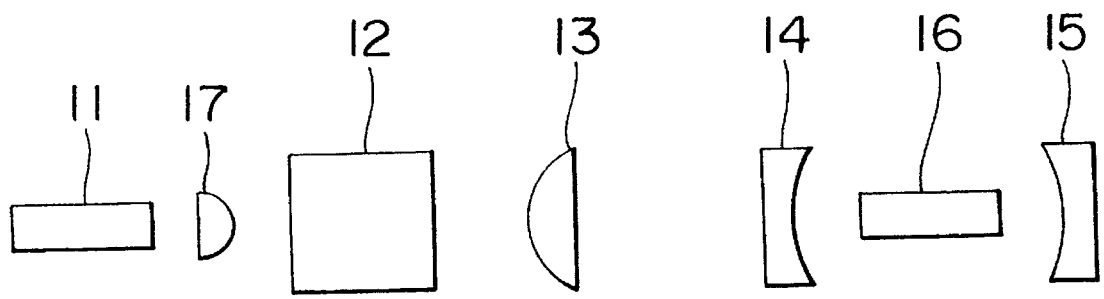
FIG. 3 is a schematic side view of an optical device using an optical mirror according to the present invention.

Then, C-coat mirror of Example 1, W-coat mirror of Comparative Example 1, and S-coat mirror of Comparative Example 2 made as mentioned above were alternately applied as the high reflecting concave mirror 14 to the optical device shown in FIG. 3 to measure second harmonic outputs.

Specifications for the device in FIG. 3 are as follows:
Laser diode 11:
  Laser diode SLD7033101 produced by SANYO Co.
  (The oscillation wavelength was set at around 862 nm)
Faraday isolator 12:
  Faraday isolator ISO-7885 produced by New Port Co.
Condenser lens 13:
  Convex lens having a 62.9 mm focal length prepared by applying low-reflective coating on a standard glass of BK7 glass
Single wavelength high reflection concave mirror 15:
  One having 99.95% of reflectance at 860 nm with a substance made of a standard glass of BK7 glass
Nonlinear optical single crystal 16:
  One prepared by optically polishing the a-surface of a KNbO$_3$ single crystal having 6 mm length before applying low-reflecting coating. The nonlinear optical single crystal 16 was held at about 31° C. by adjusting the temperature thereof using a Peltier element.
Collimator lens 17: FL-40B convex lens manufactured by New Port Co.
  Distance between the mirrors 14 and 15: about 13 mm In the optical device as above-mentioned, the harmonic outputs were measured, at a wavelength to which the fundamental wave of the resonator resonates, by means of varying the temperature of the nonlinear optical single crystal 16 by 0.1° C., thereby inducing an electric current in the laser diode.

Figure 6:
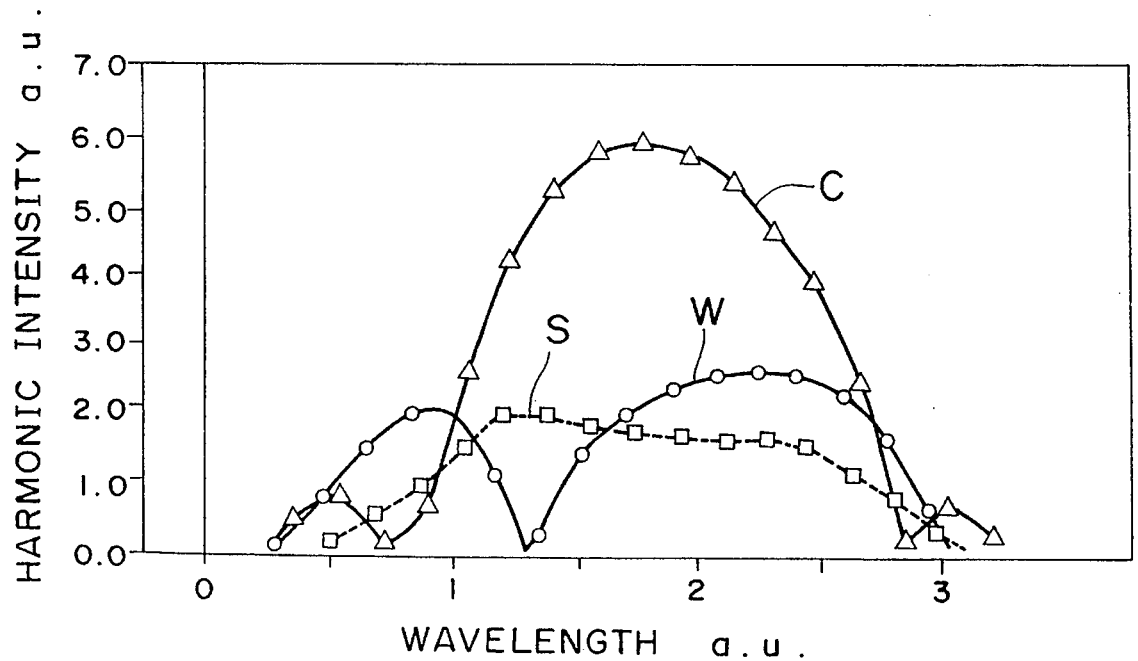
FIG. 6 shows characteristic curves measured using an optical device shown in FIG. 3 in which each of the optical mirrors made in Example 1 and Comparative Examples 1–2 are set.

The results are shown in FIG. 6 (in the figure, C is for C-coat mirror of Example 1, W is for W-coat mirror of Comparative Example 1, and S is for S-coat mirror of Comparative Example 2). The data obtained by changing the temperature of said single crystal 9 were converted to the wavelengths based on 0.3 nm=1° C.

As apparent from the results, C-coat mirror of Example 1 according to the present invention provides the harmonic output of about double as compared with W-coat mirror of Comparative Example 1 and S-coat mirror of Comparative Example 2.

<EXAMPLE 2>

As shown in FIG. 2, a first reflection multilayer film 2 that exhibits a high reflectance at 430 nm was formed on a transparent substrate 1, which is the same product as used in Example 1, by alternately laminating a reflection film 2a (0.13 μm in thickness corresponding to an optical thickness of λ/2) consisting of $SiO_2$ thin films and a reflection film 2b (0.10 μm in thickness corresponding to an optical thickness of λ/2) consisting of $TiO_2$ thin films according to deposition at such a film thickness as being capable of providing a maximum reflectance at a wavelength of 430 nm to produce twenty-nine layers (fourteen cycles plus one layer). $SiO_2$ was then laminated thereon to form a phase difference adjusting layer 4 of 0.21 μm in thickness according to deposition, which thickness corresponds substantially to an optical thickness of 4λ/5 when measured at a wavelength of 430 nm. A second reflection multilayer film 3 that prohibits a high reflectance at 860 nm was formed thereon by alternately laminating reflection films 3a (0.21 μm in thickness) consisting of $TiO_2$ thin films and reflection films 3b (0.26 μm in thickness) consisting of $SiO_2$ thin films according to deposition at such a film thickness as being capable of providing a maximum reflectance at a wavelength of 860 nm to produce twelve layers (six cycles). Thus, a two wavelengths high reflection optical mirror (hereinafter referred to as C-coat mirror) was made with the forty-two layers in total.

<Comparative Example 3>

An optical mirror (hereinafter referred to as W-coat mirror) for comparison as shown in FIG. 4 was made in the same manner as in Example 2 except that the phase difference adjusting layer was not formed.

<Comparative Example 4>

An optical mirror (hereinafter referred to as S-coat mirror) for comparison as shown in FIG. 5 was made by alternately laminating, on the transparent substrate 1 used in Example 1, reflection films 3a (0.21 μm in thickness) consisting of $TiO_2$ thin films and reflection films 3b (0.26 μm in thickness) consisting of $SiO_2$ thin films by means of deposition at such a film thickness as being capable of providing a maximum reflectance at a wavelength of 860 nm to produce twelve layers (six cycles).

Then, second harmonic outputs of C-coat mirror made in Example 2, W-coat mirror made in Comparative Example 3, and S-coat mirror made in Comparative Example 4 were measured in the same manner as in Example 1.

The results for C-coat mirror of Example 2, W-coat mirror of Comparative Example 3, and S-coat mirror of Comparative Example 4 were substantially the same as in C-coat mirror of Example 1, W-coat mirror of Comparative Example 1, and S-coat mirror of Comparative Example 2, which are shown in FIG. 6, respectively.

<EXAMPLE 3>

This Example is another embodiment of an optical mirror according to the present invention and is described with reference to FIG. 7. Both facing surfaces of a transparent substrate used in this embodiment have at least one convex portion, respectively, on which portion a plurality of reflection films and a phase difference adjusting layer as defined above are formed. The convex portion of the substrate can provide a lens effect.

Figure 7:
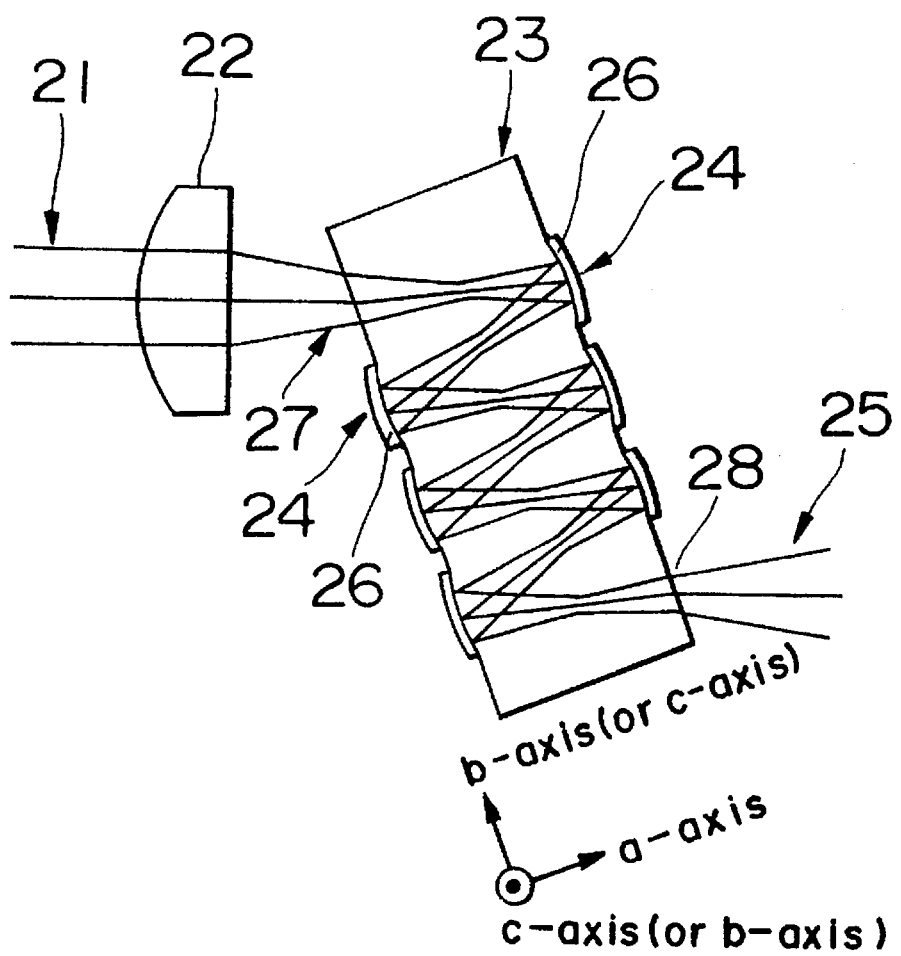
FIG. 7 is a diagrammatic view showing the cross section of the optical mirror made in Example 3.

FIG. 7 is a diagrammatic view showing a cross section of an optical mirror according to this embodiment. This optical mirror is a second harmonic generating element comprising a $KNbO_3$ a-axis single crystal 23. The $KNbO_3$ a-axis single crystal 23 is capable of generating a blue laser beam 25 of 430 nm from an infrared laser beam 21 of 860 nm as a fundamental wave in the optical mirror 22, the fundamental wave of 860 nm entered therein is reflected zigzag, while being focused in the crystal, to generate a second harmonic of 430 nm in each of the optical paths thereof. Then, the generated second harmonic wave is overlapped in spacial mode and phase-matched through all paths to thereby produce an output proportional to the square of the number of the optical paths.

The optical mirror in this embodiment was made in the following manner using a $KNbO_3$ single crystal having 5 mm length of which a-face had been polished. Spherical faces having about 0.1 mm in diameter and about 10 mm in radius of curvature were formed on both surfaces of the crystal according to the following method.

A photoresist produced by Tokyo Oka Industry Inc. under the tradename of OFPR 800 photoresist was spin-coated on a transparent substrate consisting of the $KNbO_3$ single crystal and then the substrate was prebaked to form a photoresist film with a thickness of 8 μm.

Thereafter, the substrate was circular pattern-wise exposed to a light in accordance with a so-called contact printing technique in which a photomask is contacted onto a photoresist film. The diameter of the circular pattern used herein was about 100 μm. The photoresist film was developed with a developer produced by Tokyo Oka Industry Inc. under the trade name of NMD-3 developer and then was rinsed with pure water. Thus, a photoresist film having a diameter of about 100 μm was left on the $KNbO_3$ substrate.

The substrate was then held in a clean oven maintained at a temperature of 175° C. for 30 minutes. A part of the photoresist film was heat-flowed to be deformed droplet-like by being-heated at a temperature higher than the glass transition point of a material constituting the photoresist film, whereby convex faces having a substantially spherical face and about 100 μm in radius of curvature were formed. The heating condition of the photoresist film may be sufficient temperatures, which are higher than the glass transition point of a material constituting the photoresist film, and sufficient time to heat-flow a part of the photoreist film. The same result as in the above was also obtained in the, heating condition of 150° C. for 30 minutes.

The thus treated $KNbO_3$ substrate was dry etched by means of a dry etching apparatus produced by NICHIDEN ANELVA Corporation under the tradename of ECR-310 type etching apparatus. Dry etching conditions were such that, after the dry etching chamber was exhausted to 6.5× $10^{-4}$ Pa, oxygen was introduced therein by 5 SCCM (Standard Cubic Centimeter Minutes), and dry etching was performed for 3 hours at a micro-wave output of 300 W, an enclosing magnetic field of $10^{-2}$ T, and an ion acceleration voltage of 350 V.

The photoresist film formed on the surface of the KNbO$_3$ substrate was etched under the dry etching condition as mentioned above to be completely disappeared. At the same time, the KNbO$_3$ substrate was also etched and thus convex faces having a substantially spherical face and about 100 μm in radius of curvature were formed on both facing surfaces of the substrate. Two-wavelengths high reflection coating was then applied to both surfaces of the substrate. Details of the application method are described hereinafter. Subsequently, the spherical surfaces were coated with a photoresist in accordance with the conventional photolithography technique and the substrate was dry etched with C$_2$F$_6$, as an etching gas, leaving only the portions of the spherical surfaces covered by the photoresist. Thus, the portions of the high-reflective coating film not covered by the photoresist was selectively etched away and the bare KNbO$_3$ crystal surface was exposed there at. Finally, a first low-reflection coating consisting of SiO$_2$ for an wavelength of 860 nm was applied to the incident surface 27 to form a first low-reflection single layer of SiO2 film having a thickness of about 0.3 μm, and a second low-reflection coating consisting of SiO$_2$ for a wavelength of 430 nm was applied to the emission surface 28 to form a second low-reflection single layer of SiO$_2$ film having a thickness of about 0.15 μm, thereby making a low reflective coated aperture.

The array of the spherical surfaces of the optical mirror is shown in FIG. 7. While the optical mirror allows a reflecting direction along both b- and c-axes of the crystal as shown in this figure, respectively, a case where the reflecting direction is along the b-axis having a broader allowable range of phase matching is described below.

The distance between the adjacent spherical surfaces is 0.15 mm and the crystal used has 5 mm in thickness. Thus, each optical path is set inclined ±0.86° relative to the a-axis. For example, in case of the optical path of 3.5 trips as shown in FIG. 7, the fundamental wave is incident in the incident face 27 while the fundamental wave and the second harmonic are emitted from the emission face 28.

The constitution of the two-wavelengths high reflection coating film according to the present Example is the same as in C-coat mirror of Example 1 except that the order of lamination was reversed since the incident light entering the coating film is at the side of the substrate(in this case, KNbO$_3$). More specifically, reflection films of SiO$_2$ and reflection films of TiO$_2$ were alternately laminated from the side of the KNbO$_3$ crystal at such a film thickness (about 0.15 μm) as being capable of providing a maximum reflectance at a wavelength of 860 nm in case of SiO$_2$ and at such a film thickness (about 0.11 μm) as being capable of providing a maximum reflectance at a wavelength of 860 nm in case of TiO$_2$ to produce twelve layers (six cycles). Thereafter, a film of SiO$_2$ was laminated thereon to form a phase difference adjusting layer having an optical thickness of 4/5 λ (about 0. 24 μm) when measured at 430 nm. In addition, a high reflection film, which reflects an wavelength of 430 nm, consisting of SiO$_2$ thin film having a thickness of about 0.07 μm and TiO$_2$ thin film having a thickness of about 0.05 μm was laminated into twenty-nine layers (fourteen cycles plus one layer).

<Reference Example 1>

A two-wavelength high reflection coating was formed in reverse order of lamination as compared to that of W-coat mirror of Comparative Example 1. More specifically, reflection films of SiO$_2$ and reflection films of TiO$_2$ were alternately laminated from the side of the KNbO$_3$ crystal at a film thickness of about 0.15 μm in case of SiO$_2$ and at a film thickness of about 0.11 μm in case of TiO$_2$ to produce twelve layers (six cycles). In addition, a high reflection film, which reflects an wavelength of 430 nm, consisting of SiO$_2$ thin film having a thickness of about 0.07 μm and TiO$_2$ thin film having a thickness of about 0.05 μm was laminated into twenty-nine layers (fourteen cycles plus one layer). Thereafter, the same first and second low-reflection single layers as in Example 3 were formed on the incident surface 27 and the emission surface 28, respectively, to make an aperture for reference.

Figure 8:
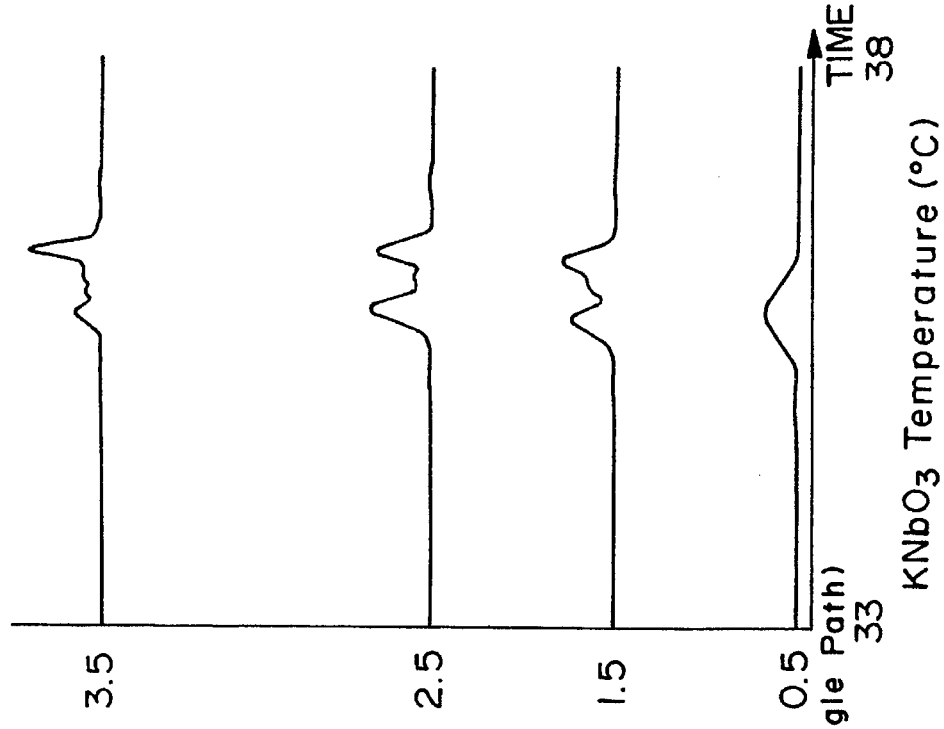
FIG. 8 is a characteristic curve of the optical mirror made in Example 3.
Figure 9:
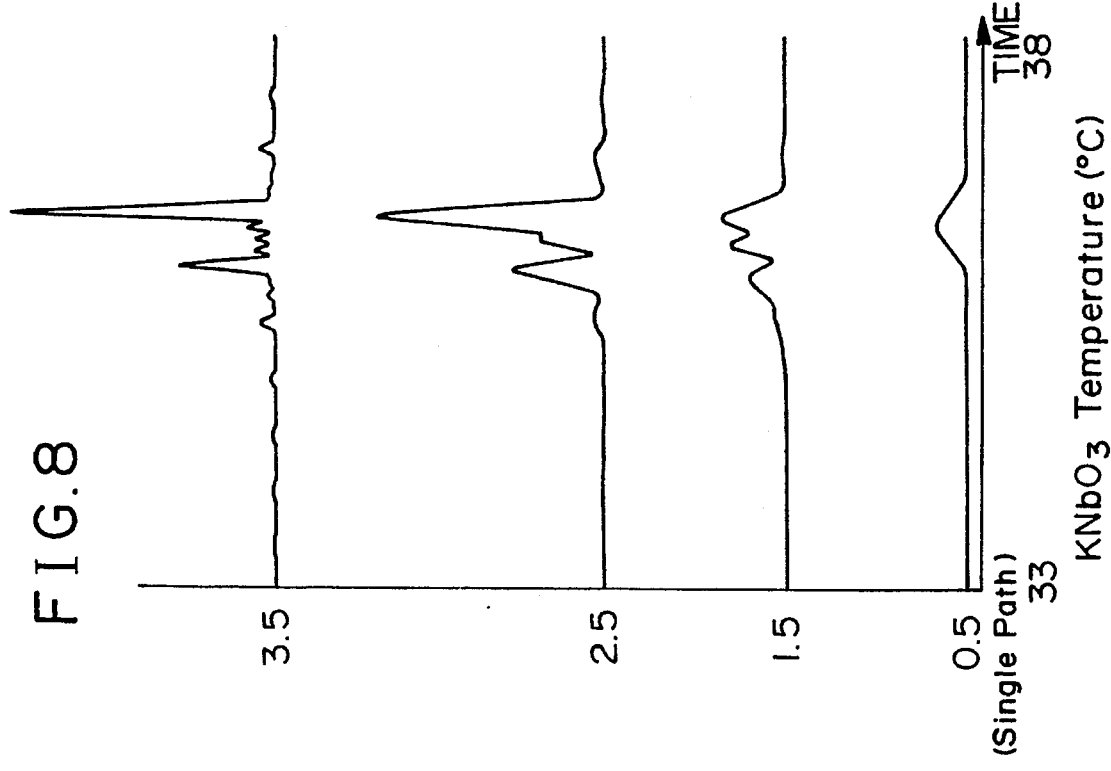
FIG. 9 is a characteristic curve of the optical mirror made in Reference Example 1.

Phase matching characteristics of the optical mirrors made in Example 3 and Reference Example 1 are shown in FIGS. 8 and 9, respectively.

The ordinate represents the output of the second harmonics, and the abscissa represents the temperature of these optical mirrors (KNbO$_3$).

The phase matching characteristics shown in FIGS. 8 and 9 were obtained at the temperature where the phase velocity of the fundamental wave and that of the second harmonic in KNbO$_3$ are equivalent. The curves illustrated in each of FIGS. 8 and 9 are, from the bottom of each figure, for one-way (single path), 1.5 trips, 2.5 trips, and 3.5 trips of the optical path(s) in the crystal. A measuring instrument used herein was maintained at a fixed sensitivity during the measurement. As apparent from these figures, a half band width of phase matching in Example 3 decreases as the number of the optical path increases and a peak intensity increases. As a result, there was obtained a characteristic as if the crystal length had been long. On the contrary, in Reference Example 1 though a peak intensity increases as the number of the optical path increases, the second harmonics generated in each optical path were canceled each other because of mismatching of their phase, so output was not as large as in Example 3.

The above Examples each are an example of a second harmonic wave generating optical mirror using KNbO$_3$ single crystal, and when the optical mirror of the present invention is used, an optical device such as a highly effective nonlinear optical element can be manufactured because high reflection is obtained while satisfying the phase matching condition required for entire nonlinear optical effects such as multiple wavelengths mixing, sum frequency generation, difference frequency generation and parametric oscillation.

Industrial Applicability

According to the present invention it is possible to provide an optical mirror and an optical device using the same in which the mirror is capable of reflecting a light beam having a plurality of wavelengths with the phase matching condition required for nonlinear optical materials being satisfied, so that a decrease in efficiency due to the phase difference does not generate even if second harmonic generation, optical mixing or optical parametric oscillation are performed, thereby being capable of improving conversion efficiency.

I claim:
1. An optical mirror comprising a plurality of reflection films formed on at least one surface of a transparent substrate each of which films corresponds to each wavelength of a light beam having a plurality of wavelengths to reflect selectively one of said plurality of wavelengths, comprising:

a phase difference adjusting layer formed between two reflection films reflecting light beams having different wavelengths, said adjusting layer adjusting interrelation between a phase of the light beam reflected by one of the reflection films and a phase of the light beam reflected by the other of the reflection films.

2. An optical mirror as claimed in claim 1, wherein said reflection films are formed on one surface of the transparent substrate.

3. An optical mirror as claimed in claim 1, wherein a plurality of wavelength constituting the light beam are in a relation of a multiple of an integral number or in a relation of a reciprocal of an integral number with each other.

4. An optical mirror as claimed in claim 1, wherein said phase difference adjusting layer is made of the same material as any one of said reflection films.

5. An optical mirror as claimed in claim 1, wherein said phase difference adjusting layer is formed between adjacent two reflection multilayer films.

6. An optical mirror as claimed in claim 1, wherein said reflection films is laminated as two layers and one of these reflection films is a reflection film being non-selective to the wavelengths.

7. An optical mirror as claimed in claim 6, wherein said non-selective reflection film is a metal film.

8. An optical mirror as claimed in claim 1, wherein said reflection films each consist of multilayer films.

9. An optical mirror as claimed in claim 8, wherein said phase difference adjusting layer is formed between the multilayer films of a first reflection multilayer film or between the multilayer films of a second reflection multilayer film.

10. An optical mirror as claimed in claim 1, wherein a plurality of said reflection films are formed on each of both facing surfaces of said transparent substrate, respectively.

11. An optical mirror as claimed in claim 10, wherein each of both facing surfaces of said transparent substrate has at least one convex portion and said reflection films are formed on the convex portion.

12. An optical mirror as claimed in claim 10, wherein said transparent substrate is made of a nonlinear optical crystal.

13. An optical device comprising an optical mirror as claimed in claim 1.

14. An optical mirror comprising a plurality of reflection films formed on at least one surface of a transparent substrate each of which films corresponds to each wavelength of a light beam having a plurality of wavelengths to reflect selectively one of said plurality of wavelengths, comprising:

a phase difference adjusting layer 0.2 to 1 µm thick formed between two reflection films which selectively reflect light beams having different wavelengths, said adjusting layer adjusting interrelation between a phase of the light beam reflected by one of the reflection films having a thickness of 2 to 4 µm, and a phase of the light beam reflected by the other of the reflection films having a thickness of 2 to 4 µm, wherein the thickness of the phase adjusting layer corresponds to ½ λ of one of the reflected light beams.

15. An optical mirror as claimed in claim 14, wherein said reflection films are formed from layers of $SiO_2$ or $TiO_2$ or $SiO_2$ and $TiO_2$ deposited or laminated on one surface of the transparent substrate.

16. An optical mirror as claimed in claim 14, wherein said phase difference adjusting layer is formed between adjacent two reflection multilayer films.

17. An optical mirror as claimed in claim 14, wherein a plurality of said reflection films are formed on each of both facing surfaces of said transparent substrate, respectively.

18. An optical mirror as claimed in claim 17, wherein each of both facing surfaces of said transparent substrate has at least one convex portion and said rejection films are formed on the convex portion.

19. An optical mirror comprising a plurality of reflection films formed on at least one surface of a transparent substrate each of which films corresponds to each wavelength of a light beam having a plurality of wavelengths to reflect selectively one of said plurality of wavelengths, comprising:

a phase difference adjusting layer 0.05 to 0.5 µm thick formed between two reflection films which selectively reflect light beams having different wavelengths, said adjusting layer adjusting interrelation between a phase of the light beam reflected by one of the reflection films having a thickness of 2 to 4 µm, and a phase of the light beam reflected by the other of the reflection films having a thickness of 2 to 4 µm, wherein the thickness of the phase adjusting layer corresponds to ¼ λ of one of the reflected light beams.

20. An optical mirror as claimed in claim 19, wherein said reflection films are formed from layers of $SiO_2$ or $TiO_2$ or $SiO_2$ and $TiO_2$ deposited or laminated on one surface of the transparent substrate.

21. An optical mirror as claimed in claim 19, wherein said phase difference adjusting layer is formed between adjacent two reflection multilayer films.

22. An optical mirror as claimed in claim 19, wherein a plurality of said reflection films are formed on each of both facing surfaces of said transparent substrate, respectively.

23. An optical mirror as claimed in claim 22, wherein each of both facing surfaces of said transparent substrate has at least one convex portion and said reflection films are formed on the convex portion.

* * * * *